United States Patent
Förster et al.

(10) Patent No.: US 12,240,430 B2
(45) Date of Patent: Mar. 4, 2025

(54) METHOD FOR OPERATING A BRAKING SYSTEM FOR A MOTOR VEHICLE AND CORRESPONDING BRAKING SYSTEM

(71) Applicant: AUDI AG, Ingolstadt (DE)

(72) Inventors: Kilian Förster, Beilngries (DE); Frank Müller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 118 days.

(21) Appl. No.: 18/348,668

(22) Filed: Jul. 7, 2023

(65) Prior Publication Data

US 2024/0034295 A1   Feb. 1, 2024

(30) Foreign Application Priority Data

Jul. 26, 2022   (DE) .......................... 102022118676.8

(51) Int. Cl.
   *B60T 17/22*   (2006.01)

(52) U.S. Cl.
   CPC ....... *B60T 17/221* (2013.01); *B60T 2270/406* (2013.01)

(58) Field of Classification Search
   CPC ............. B60T 17/221; B60T 2270/406; B60T 2270/82; B60T 2270/86; B60T 7/042; B60T 13/662; B60T 17/223; B60T 8/885; B60T 8/17; B60T 7/06; B60T 17/22; B60T 13/74; B60Y 2306/15; B60Y 2400/81; B60Y 2400/90
   See application file for complete search history.

(56) References Cited

U.S. PATENT DOCUMENTS

| 8,287,055 | B2 * | 10/2012 | Lee ....................... B60T 13/662 |
| | | | 303/20 |
| 2020/0207318 | A1 * | 7/2020 | Dettman ................. B60T 10/04 |

FOREIGN PATENT DOCUMENTS

| CN | 106089459 A | 11/2016 |
| CN | 111022628 A | 4/2020 |
| CN | 114734968 A | 7/2022 |
| DE | 102014015445 A1 | 4/2015 |
| DE | 102014226211 A1 | 6/2016 |

(Continued)

OTHER PUBLICATIONS

Search Report issued on Mar. 15, 2023, in corresponding German Application No. 102022118676.8, 12 pages.

(Continued)

*Primary Examiner* — Sizo B Vilakazi

(74) *Attorney, Agent, or Firm* — Maier & Maier, PLLC

(57) ABSTRACT

A method for operating a braking system for a motor vehicle, including a service brake unit and the service brake unit is activated to generate a brake force on a wheel axle of the motor vehicle at least temporarily as a function of a setting of an operating element. The generation of the brake force is performed using a calibration data set stored in a control unit of the braking system. An identifier stored in the operating element is transmitted to the control unit and used for a compatibility check. If the compatibility check is successful, a configuration of the operating element takes place and a generic data set stored in the control unit is used as the calibration data set and an operating element-specific data set stored in the operating element is transmitted to the control unit and used as a calibration data set after the transmission.

20 Claims, 1 Drawing Sheet

(56) References Cited

FOREIGN PATENT DOCUMENTS

| | | |
|---|---|---|
| DE | 112016001509 T5 | 3/2018 |
| DE | 102017200384 A1 | 7/2018 |
| DE | 102018200313 A1 | 7/2019 |
| DE | 102021207244 A1 | 1/2023 |
| EP | 3031659 A1 | 6/2016 |
| EP | 2563622 B1 | 7/2020 |
| FR | 2866962 A1 | 9/2005 |

OTHER PUBLICATIONS

Extended European Search Report issued on Dec. 1, 2023, in corresponding European Application No. 23180815.5, 10 pages.
Office Action issued on Nov. 11, 2024, in corresponding Korean Application No. 10-2023-0093729, 8 pages.

\* cited by examiner

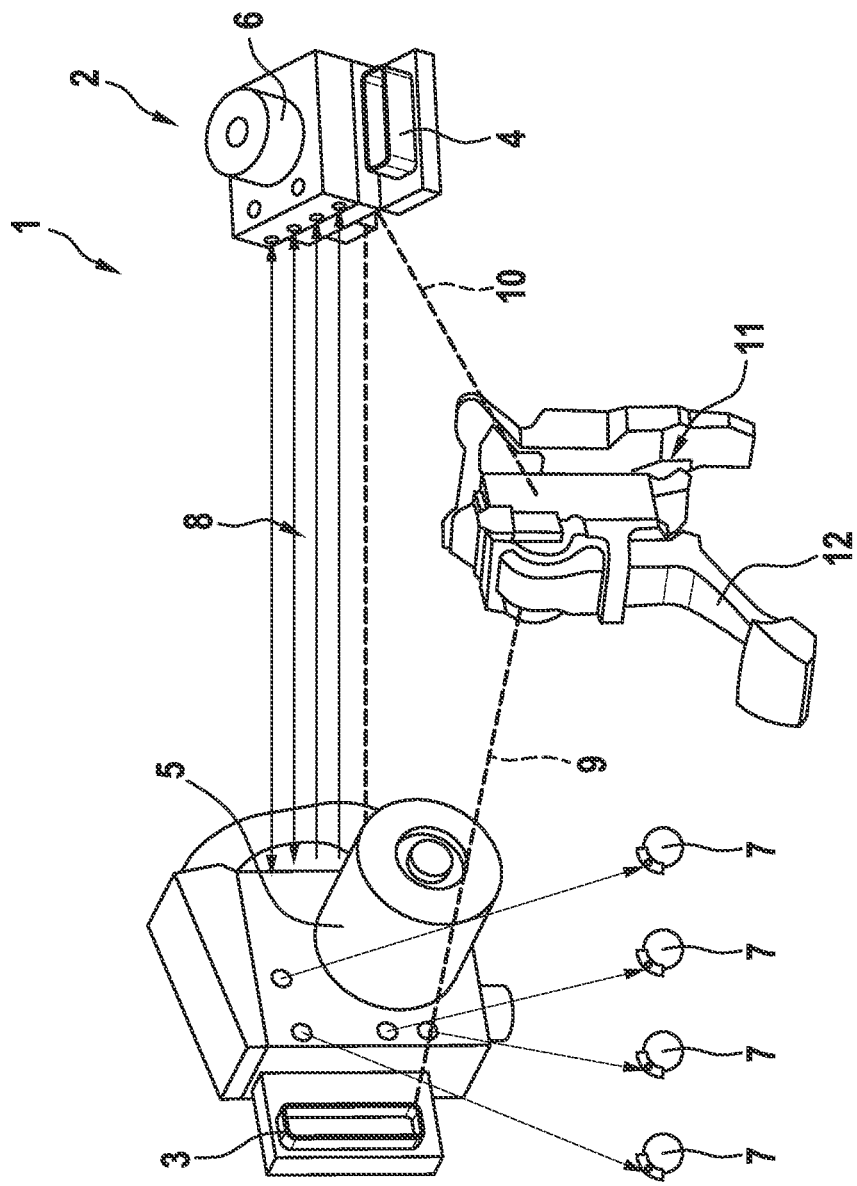

METHOD FOR OPERATING A BRAKING SYSTEM FOR A MOTOR VEHICLE AND CORRESPONDING BRAKING SYSTEM

FIELD

The invention relates to a method for operating a braking system for a motor vehicle, wherein the braking system includes a service brake unit and the service brake unit is activated to generate a brake force on the wheel axle of the motor vehicle at least temporarily as a function of a setting of an operating element. The invention furthermore relates to a braking system for a motor vehicle.

BACKGROUND

Document DE 11 2016 001 509 T5 is known from the prior art, for example. This describes a brake control unit, which comprises a brake command addition section for adding an automatic braking brake command value, which is output by an automatic braking brake command computation section, and a pedal actuation brake command set, which is output by a pedal actuation brake command computation section. The pedal actuation brake command computation section comprises a pedal actuation brake command selection section, a normal braking property section for holding a normal braking property and an automatic braking property section for holding an automatic braking property. The pedal actuation brake command selection section selects a brake command value which is output by the automatic braking property section if the automatic braking brake command value is more than 0, and outputs the selection result to the brake command addition section as the pedal actuation brake command value.

SUMMARY

It is the object of the invention to propose a method for operating a braking system for a motor vehicle which has advantages over known methods, in particular enables the activation of the service brake unit in a particularly reliable manner, even after an installation and/or replacement of an operating element of the braking system.

This is achieved according to the invention by a method for operating a braking system for a motor. It is provided here that the brake force is generated as a function of the setting of the operating element using a calibration data set stored in a control unit of the braking system, wherein an identifier stored in the operating element is transmitted to the control unit and used there for a compatibility check and if the compatibility check is successful, the operating element is configured in that a generic data set stored in the control unit is used as the calibration data set and an operating element-specific data set stored in the operating element is transmitted to the control unit and used as the calibration data set after the transmission.

It is to be noted that the exemplary embodiments explained in the description are not restrictive; rather, arbitrary variations of the features disclosed in the description, the claims, and the figures are implementable.

The method is used for operating the braking system. This is preferably part of the motor vehicle, but of course can also be provided separately therefrom. The braking system is used for braking the motor vehicle, thus reducing the velocity of the motor vehicle, in particular to a standstill, and/or fixing the motor vehicle at a standstill. For the former, the braking system includes the service brake unit, which causes a brake force at least temporarily on at least one wheel of the motor vehicle, preferably on multiple or all wheels of the motor vehicle. This brake force can also be designated as the service brake force.

If the multiple wheels are provided, the at least one wheel is thus to be considered a part of these multiple wheels. When reference is made in the scope of this description to the wheel or the at least one wheel, the statements are thus equivalent. Moreover, they are preferably transferable to each of the multiple wheels.

The at least one wheel is assigned to the wheel axle of the motor vehicle to which the brake force is applied with the aid of the service brake unit. The wheel axle is, for example, a rear wheel axle or a front wheel axle of the motor vehicle. The service brake unit is preferably provided and designed to apply the brake force at least temporarily to multiple wheels of the wheel axle and/or wheels of multiple wheel axles. The service brake unit is particularly preferably used to apply the brake force at least temporarily to multiple or all wheel axles of the motor vehicle or the wheels thereof or to brake the corresponding wheels.

The service brake unit has at least one wheel brake, which is assigned to the at least one wheel or the at least one wheel axle. The service brake unit preferably includes multiple wheel brakes, wherein each of the wheel brakes is assigned to a wheel or a wheel axle of the motor vehicle. The wheel brakes are particularly preferably provided on multiple wheels and/or wheel axles, in particular, a separate wheel brake is assigned to each wheel and/or each wheel axle of the motor vehicle. The brake force is applied to the wheel axle or the respective wheel of the motor vehicle by means of the wheel brake.

The brake force caused by means of the service brake unit can typically be set arbitrarily. This takes place as a function of the setting of the operating element, via which a driver of the motor vehicle specifies the brake force. The operating element is arranged so it is reachable by the driver from a passenger compartment of the motor vehicle, in particular it is present at least in some areas in the passenger compartment or protrudes therein. The operating element is particularly preferably designed as a brake pedal, thus is provided and designed for actuation by a foot of the driver or for foot actuation by the driver and is arranged accordingly.

The brake system evaluates the setting of the operating element, for example its position, and ascertains the brake force specified by the driver from the setting. This can also be designated as the specification brake force. The service brake unit is activated in such a way that it causes the brake force which corresponds to the specification brake force on the wheel axle of the motor vehicle or the at least one wheel. In particular, the service brake unit will specify a target brake force corresponding to the specification brake force and it sets an actual brake force acting on the wheel axle or the at least one wheel in such a way that it corresponds to the target brake force and therefore the specification brake force.

The service brake unit is at least temporarily connected solely electronically to the operating element, so that activation of the wheel brake or the wheel brakes as a function of the setting of the operating element is at least temporarily performed solely electronically. However, it can be provided that a mechanical and/or hydraulic fallback level is present between the operating element in the wheel brake, so that in the event of a failure of the electronic connection by means of the operating element, the brake force can nonetheless be caused or set. However, the operating element is particularly preferably permanently connected solely electronically to the service brake unit or, vice versa, the service brake unit is permanently connected solely electronically to the operating element.

The generation of the brake force as a function of the setting of the operating element is performed using a calibration data set stored in a control unit of the brake system. This means that the brake force is not exclusively dependent on the setting of the operating element, but rather in addition on the calibration data set. In particular, the setting of the operating element is used as an input variable for the calibration data set and the brake force is used as an output variable. It is thus preferably provided that the above-mentioned specification brake force is ascertained using the calibration data set from the setting of the operating element. The target brake force corresponding to the specification brake force is then set at the service brake unit, which sets the actual brake force acting on the wheel axle of the motor vehicle such that it corresponds to the target brake force.

The calibration data set comprises in particular items of information about the operating element, in particular a relationship between the setting of the operating element and the brake force to be generated or the specification brake force. In particular, the calibration data set relates different values for the setting of the operating element to different values for the brake force or the specification brake force. The calibration data set preferably contains a value for the brake force to be generated in each case for different values of the setting of the operating element. The values for the brake force to be generated are at least partially different from one another for different values of the setting.

The calibration data set is provided, for example, in the form of a table, a characteristic diagram, or a mathematical relationship. It is of fundamental importance that the brake force or the specification brake force is only indirectly dependent on the setting of the operating element, namely via the calibration data set. The calibration data set is insofar necessary in order to ascertain the brake force from the setting of the operating element.

The operating element is connected electrically, preferably permanently solely electrically, to the control unit and transmits its setting thereto. The control unit uses the data set to determine the associated brake force or the specification brake force for the setting transmitted from the operating element to the control unit. The control unit then activates the service brake unit to generate the brake force. The calibration data set insofar has to be stored in the control unit of the braking system.

It is preferably provided that the operating element-specific data set is stored in the operating element. The operating element-specific data set is matched to the operating element, for example, it is ascertained during a calibration of the operating element and stored in the operating element. The operating element has a corresponding data memory for this purpose. For example, the operating element-specific data set is ascertained during a production of the operating element and/or before an installation of the operating element in the motor vehicle and stored in the operating element.

The operating element transmits the operating element-specific data set at least once to the control unit of the braking system, preferably once after an installation of the operating element in the motor vehicle. However, it can also be provided that the operating element transmits the operating element-specific data set multiple times, in particular periodically, to the control unit. The control unit receives the operating element-specific data set from the operating element and uses it after the transmission as a calibration data set. It can be provided in this case that only the operating element-specific data set transmitted the first time from the operating element is used as a calibration data set. Subsequent transmissions of the operating element-specific data set from the operating element to the control unit are ignored in this case and the calibration data set used is maintained, at least if a replacement of the operating element is not established, thus the operating element is unchanged.

Since the transmission of the operating element-specific data set to the control unit occupies a certain period of time and the operating element-specific data set is not available as a calibration data set during this period of time, the braking system would have to display an error and/or the motor vehicle would have to be taken out of operation in order to ensure a high level of safety for the driver of the motor vehicle. However, since it is to be made possible for the driver to start up the motor vehicle rapidly, the identifier is stored in the operating element. This identifier is transmitted to the control unit and used there for a compatibility check. The compatibility check is to be understood to mean that a check is performed as to whether the operating element and its behavior are fundamentally known to the control unit.

If the compatibility check is successful, thus the operating element is fundamentally known to the control unit, the operating element is thus configured for the operation in the context of the braking system. This configuration takes place in that initially the generic data set stored in the control unit is used as a calibration data set. Simultaneously or subsequently, the operating element-specific data set is transmitted to the control unit in the above-described manner. After the operating element-specific data set has been completely transmitted or after a termination of the transmission, a switch is made from the generic data set to the operating element-specific data set, so that subsequently the operating element-specific data set, and no longer the generic data set, is used as the calibration data set.

This procedure enables safe and reliable operation of the braking system or the motor vehicle already while the operating element-specific data set is being transmitted from the operating element to the control unit. The complete function of the operating element or the braking system is thus ensured already immediately after the startup of the operating element and the driver at least approximately receives the expected brake force upon a defined actuation of the operating element.

The operating element-specific data set preferably differs from the generic data set. The generic data set is ascertained, for example, on the basis of a plurality of identical operating elements, preferably by averaging over the operating element-specific data sets of these operating elements. Preferably, a plurality of operating elements is provided and each of the operating elements is calibrated and in each case in operating element-specific data set is created in this case and stored in the corresponding operating element. The generic data set is then determined from this plurality of operating element-specific data sets and stored in the control unit. The generic data set thus already represents a good approximation of the operating element-specific data set of the operating element and can accordingly be used at least temporarily as the calibration data set in order to enable the operation of the braking system.

The generic data set is preferably fixedly stored in the control unit and is thus also not changed or overwritten by the transmission of the operating element-specific data set. It is thus ensured, for example, that upon a replacement of the operating element by another operating element, the generic data set is also available for the operation of the braking system using the other operating element. In other words, the generic data set is preferably permanently fixedly stored in the control unit.

The identifier preferably includes a smaller amount of data than the operating element-specific data set. The identifier is accordingly transmitted faster to the control unit than the operating element-specific data set. This enables a rapid startup of the braking system in the operating element. The amount of data of the identifier is preferably at most 10%, at most 5%, or at most 1% of the amount of data of the operating element-specific data set. The identifier preferably consists of at most a few bits, in particular at most 16 bits, at most 8 bits, or at most 4 bits. The transmission of the identifier and/or the operating element-specific data sent to the control unit preferably takes place via a data bus, in particular via a SENT bus, preferably via its slow channel.

In one preferred embodiment, it is moreover provided that multiple generic data sets are stored in the control unit. Each of these generic data sets is assigned to one of multiple different values of the identifier. After the transmission of the identifier stored in the operating element to the control unit, it is insofar checked whether a generic data set is stored for the transmitted identifier or its value. If this is the case, the compatibility check is thus successful and the configuration of the operating element is performed. In this case, the generic data set stored in the control unit which is assigned to the transmitted identifier is used as the calibration data set and the method continues as already described.

The described procedure enables a rapid startup of the braking system and reliable operation. In particular, the expected functionality of the braking system is already established promptly after the installation of the operating element, namely on the basis of the generic data set.

One refinement of the invention provides that a registration number stored in the operating element is transmitted to the control unit and is compared there to a stored registration number, wherein the configuration of the operating element is performed in the event of a difference between the transmitted registration number and the registration number stored in the control unit. The registration number is stored in addition to the identifier in the operating element.

The registration number can be specific to the operating element and can be provided in this case, for example, as the serial number of the operating element. During the production of multiple operating elements, different serial numbers are preferably assigned thereto, so that a unique assignment of the operating element can take place. However, the registration number can also be identical for several of the control units, in particular for only a part of the control units, and can be provided in this case, for example, as a part number. Differently designed operating elements have different part numbers, while the part numbers of identical operating elements are also identical.

The registration number enables the braking system to establish easily whether a replacement of the operating element was performed. For this purpose, the registration number stored in the operating element is transmitted to the control unit. It is compared there to the stored registration number. If the transmitted registration number differs from the stored registration number, it is thus presumed that the operating element was replaced. In this case, preferably only in this case, the configuration of the operating element is performed.

Particularly preferably, the identifier stored in the operating element is preferably transmitted to the control unit and used there for the compatibility check only in the event of the difference between the transmitted registration number and the registration number stored in the control unit. This means that the compatibility check is only performed if the transmitted registration number differs from the registration number stored in the control unit. If the transmitted registration number corresponds to the registration number stored in the control unit, the configuration of the operating element and/or the performance of the compatibility check and/or the transmission of the identifier do not take place.

The registration number preferably only has a small amount of data, for example, its amount of data is at most as large as the amount of data of the identifier or greater by a factor of at most 2, at most 4, or at most 8 than the amount of data of the identifier. Such a procedure enables efficient checking for a replacement of the operating element. Preferably, the transmitted registration number is stored in the control unit after the configuration, in particular immediately after the transmission of the operating element-specific data set to the control unit, and subsequently used for the comparison to the transmitted registration number.

One refinement of the invention provides that the use of the operating element-specific data set takes place in that the calibration data set is overwritten by the operating element-specific data set or a switch is made from the calibration data set to the operating element-specific data set. In the context of the overwriting, the operating element-specific data set is written in a memory area of the data memory of the control unit in which the calibration data set is already present. Otherwise, after the transmission, the calibration data set and the operating element-specific data set are present at different address areas of the data memory and a switch is made from the address area of the calibration data set to the address area of the operating element-specific data set, in order to subsequently use the operating element-specific data set as the calibration data set. Such a procedure enables an efficient integration of the operating element-specific data set.

One refinement of the invention provides that a warning signal is generated during the compatibility check and/or during the configuration. The warning signal is used to indicate to the driver of the motor vehicle and/or a device of the motor vehicle different from the braking system that the braking system is not completely functional under certain circumstances, but rather restrictions of the functionality have to be expected. The generation of the warning signal is used for safer operation of the braking system and/or the motor vehicle.

One refinement of the invention provides that in the event of a failed compatibility check, an error signal is generated and/or training of the operating element is carried out. If the compatibility check fails, it is thus established that the operating element cannot be operated reliably in the context of the braking system. The error signal is accordingly generated. Additionally or alternatively, the training of the operating element is performed if the compatibility check fails. Training is to be understood to mean that the calibration data set is written in the control unit, for example externally.

During the training of the operating element, the control unit is parameterized such that the operating element is usable to carry out an intended operation of the braking system. The calibration data set is written in the control unit, for example, by means of a device only connected temporarily to the control unit, for example, by means of a mobile device. The device is preferably only temporarily connected to the control unit, in particular via a data bus. The connection between the external device and the control unit is interrupted before a start of operation of the motor vehicle or the braking system.

The described procedure enables the operation of an operating element in the context of the braking system for which the compatibility check is not successful. For this purpose, however, a greater level of effort is necessary than for an operating element for which the compatibility check can be performed successfully.

One refinement of the invention provides that the warning signal and/or the error signal are suppressed over a defined period of time, in particular immediately following a start of operation of the braking system. The suppression of the warning signal or the error signal has the result that the respective signal is not externally visible. The control unit thus externally has the same state as if the warning signal or the error signal had not been generated. The suppression of the warning signal and/or the error signal takes place over the defined period of time, for example, over at least 1 second and at most 30 seconds, at least 5 seconds and at most 20 seconds, or in approximately or precisely 10 seconds or 15 seconds. The period of time preferably begins with a start of operation of the braking system, thus as soon voltage is applied at the terminal 15 of the motor vehicle. Unnecessary warning messages or error messages are suppressed in this way.

One refinement of the invention provides that the warning signal and/or the error signal are displayed by means of a display device. The display device is used to display the warning signal or the error signal, preferably in an interior of the motor vehicle and/or for the driver of the motor vehicle. The display device is, for example, an optical or an acoustic display device. In particular, the warning signal is signaled by means of a yellow light and the error signal is signaled by means of a red light. A reliable warning of a possible impairment of the operation of the braking system is ensured in this way.

One refinement of the invention provides that in the context of the compatibility check, the identifier is used as an input variable for a characteristic diagram or a table, which has a compatibility parameter as an output variable, wherein the compatibility check is classified as successful in the case of a first value of the ascertained compatibility parameter and is classified as failed in the case of a second value. The characteristic diagram or the table is stored in the control unit. The transmitted registration number is evaluated with the aid of the characteristic diagram or the table; it is accordingly used as an input variable. As a function of the identifier and is ascertained with the aid of the characteristic diagram or the table from the identifier.

The characteristic diagram or the table preferably only contains two different values for the compatibility parameter, namely the first value and the second value. If the first value results for the compatibility parameter from the characteristic diagram or the table with use of the identifier as the input variable, it is thus presumed that the operating element is compatible and the compatibility check is accordingly successful. In contrast, if the second value is provided, the operating element is thus classified as incompatible and the compatibility check therefore fails. This enables a simple check of the compatibility of the operating element.

One refinement of the invention provides that the control unit is a first control unit and a second control unit, which is operated and analogously to the first control unit, is provided in addition to the first control unit. The first control unit and the second control unit are designed redundantly and/or are operated redundantly to ensure a high level of reliability and safety of the braking system. It is preferably provided that the first control unit and the second control unit are connected separately from one another to the operating element and the identifier is transmitted from the operating element to each of the control units.

The compatibility check is also performed separately in each of the control units. The operation of the operating element using the operating element-specific data set as the calibration data set is only permitted when the compatibility check is successful in each of the control units. Otherwise, the error signal is preferably generated. The operating element preferably includes multiple redundant sensors, wherein the control units are connected to different ones of these redundant sensors of the operating element. The redundant sensors are each used to detect the setting of the operating element, thus, for example, the position of the operating element. The above-mentioned reliability of the braking system is achieved in this way.

The invention furthermore relates to a braking system for a motor vehicle, in particular for carrying out a method according to the statements in the scope of this description, wherein the braking system includes a service brake unit and the service brake unit is activated to generate a brake force on a wheel axle of the motor vehicle at least temporarily as a function of a setting of an operating element. The braking system is provided and designed here to perform the generation of the brake force as a function of the setting of the operating element using a calibration data set stored in a control unit of the braking system, wherein an identifier stored in the operating element is transmitted to the control unit and is used there for a compatibility check and, if the compatibility check is successful, a configuration of the operating element takes place in that a generic data set stored in the control unit is used as the calibration data set and an operating element-specific data set stored in the operating element is transmitted to the control unit and is used as the calibration data set after the transmission.

The advantages of such a procedure or such a design of the braking system have already been indicated. Both the braking system and the method for its operation can be refined according to the statements in the context of this description, so that reference is insofar made thereto.

The features and combinations of features described in the description, in particular the features and combinations of features described in the following description of the figures and/or shown in the figures are usable not only in the respective specified combination but also in other combinations or alone, without departing from the scope of the invention. Therefore, embodiments are also to be considered to be comprised by the invention which are not explicitly shown or explained in the description and/or the figures, but can be inferred from the explained embodiments or are derivable therefrom.

BRIEF DESCRIPTION OF THE FIGURE(S)

The invention will be explained hereinafter on the basis of exemplary embodiments illustrated in the drawings, without the invention being restricted. In the single FIGURE FIG. 1 shows a schematic illustration of a braking system for a motor vehicle.

DETAILED DESCRIPTION

FIG. 1 shows an extremely schematic illustration of a braking system 1 for a motor vehicle. The braking system 1 has a service brake unit 2, which in turn includes a first control unit 3 and a second control unit 4. The control units 3 and 4 are each connected to a brake actuator 5 or 6, respectively, by means of which wheel brakes 7 can be activated to generate a brake force on a wheel or a wheel axle of the motor vehicle. The control units 3 and 4 are connected to one another via a data bus 8. They communicate via the data bus 8 to implement a redundant operation. A high level of operational reliability of the braking system 1 is thus achieved.

The control units 3 and 4 are connected via further data buses 9 and 10 to an operating element 11, in particular solely electrically. The operating element 11 is provided in the exemplary embodiment shown here as a brake pedal. It has a foot pedal 12, by means of which a driver of the motor vehicle can specify a brake force. This specified brake force can also be designated as the specification brake force. The specification brake force is first ascertained in the control unit 3 or 4. A setting of the operating element 11 is insofar first transmitted via the data bus 9 or 10, for example a position of the operating element 11 or the foot pedal 12. The specification brake force is ascertained from this position in the control unit 3 or 4 using a calibration data set and the respective brake actuator 5 or 6 and therefore the wheel brakes 7 are activated to achieve an actual brake force corresponding to the specification brake force.

The calibration data set is stored in the respective control unit 3 or 4. It is matched to the respective operating element 11. During a first startup of the operating element 11, an operating element-specific data set stored in the operating element 11 is transmitted to the control unit 3 or 4 and used as the calibration data set after the transmission. To enable reliable and safe operation of the braking system 1 already before the complete transmission of the operating element-specific data set to the control unit 3 or 4, before the transmission of the operating element-specific data set, an identifier also stored in operating element 11 is transmitted to the control unit 3 or 4. The control unit 3 or 4 carries out a compatibility check on the basis of the identifier.

If the compatibility check has the result that the operating element 11 is compatible with the braking system 1, the compatibility check is thus successful and the operating element is configured. The configuration of the operating element 11 comprises transmitting the operating element-specific data set to the control unit 3 or 4. After the complete transmission, the operating element-specific data set is used as the calibration data set. Until the complete transmission, thus until the termination of the transmission, in contrast, a generic data set is used as the calibration data set. The generic data set is designed such that it enables a reliable and accurate ascertainment of the specification brake force from the setting of the respective operating element 11 for each of a plurality of operating elements 11.

If it is established on the basis of the identifier transmitted to the control unit 3 or 4 that the operating element 11 is not compatible, an error signal is thus generated. Additionally or alternatively, training of the operating element is performed, in the context of which the calibration data set is stored in the control unit 3 or 4, in particular by transmission from an external device. This can take place, for example, in the context of a maintenance of the motor vehicle or a repair shop visit. Safer and more reliable operation of the braking system 1 is ensured by the described procedure in any case.

LIST OF REFERENCE SIGNS 1 braking system
2 service brake unit
3 first control unit
4 second control unit
5 brake actuator
6 brake actuator
7 wheel brake
8 data bus
9 data bus
10 data bus
11 operating element
12 foot pedal

The invention claimed is:

1. A method for operating a braking system for a motor vehicle, wherein the braking system includes a service brake unit and the service brake unit is activated to generate a brake force on a wheel axle of the motor vehicle at least temporarily as a function of a setting of an operating element, wherein the generation of the brake force as a function of the setting of the operating element is performed using a calibration data set stored in a control unit of the braking system, wherein an identifier stored in the operating element is transmitted to the control unit and used there for a compatibility check and, if the compatibility check is successful, a configuration of the operating element takes place in that a generic data set stored in the control unit is used as the calibration data set and an operating element-specific data set stored in the operating element is transmitted to the control unit and used as a calibration data set after the transmission.

2. The method as claimed in claim 1, wherein a registration number stored in the operating element is transmitted to the control unit and compared there to a stored registration number, wherein the configuration of the operating element is performed in the event of a difference between the transmitted registration number and the registration number stored in the control unit.

3. The method as claimed in claim 1, wherein the operating element-specific data set is used in that the calibration data set is overwritten by the operating element-specific data set or a switch is made from the calibration data set to the operating element-specific data set.

4. The method as claimed in claim 1, wherein a warning signal is generated during the compatibility check and/or during the configuration.

5. The method as claimed claim 1, wherein if the compatibility check fails, an error signal is generated and/or training of the operating element is carried out.

6. The method as claimed in claim 1, wherein the warning signal and/or the error signal are suppressed over a defined period of time.

7. The method as claimed in claim 1, wherein the warning signal and/or the error signal are displayed by means of a display device.

8. The method as claimed in claim 1, wherein, in the context of the compatibility check, the identifier is used as an input variable for a characteristic diagram or a table, which includes a compatibility parameter as an output variable, wherein the compatibility check is classified as successful with a first value of the ascertained compatibility parameter and is classified as failed with a second value.

9. The method as claimed in claim 1, wherein the control unit is a first control unit and, in addition to the first control unit, a second control unit is provided, which is operated analogously to the first control unit.

10. A braking system for a motor vehicle, comprising: a service brake unit and the service brake unit is activated to generate a brake force on a wheel axis of the motor vehicle at least temporarily as a function of a setting of an operating element, wherein the braking system is provided and designed to perform the generation of the brake force as a function of the setting of the operating element using a calibration data set stored in a control unit of the braking system, wherein an identifier stored in the operating element is transmitted to the control unit and is used there for a compatibility check and, if the compatibility check is successful, the operating element is configured in that a generic data set stored in the control unit is used as the calibration data set and an operating element-specific data set stored in the operating element is transmitted to the control unit and is used as the calibration data set after the transmission.

11. The method as claimed in claim 2, wherein the operating element-specific data set is used in that the calibration data set is overwritten by the operating element-specific data set or a switch is made from the calibration data set to the operating element-specific data set.

12. The method as claimed in claim 2, wherein a warning signal is generated during the compatibility check and/or during the configuration.

13. The method as claimed in claim 3, wherein a warning signal is generated during the compatibility check and/or during the configuration.

14. The method as claimed claim 2, wherein if the compatibility check fails, an error signal is generated and/or training of the operating element is carried out.

15. The method as claimed claim 3, wherein if the compatibility check fails, an error signal is generated and/or training of the operating element is carried out.

16. The method as claimed claim 4, wherein if the compatibility check fails, an error signal is generated and/or training of the operating element is carried out.

17. The method as claimed in claim 2, wherein the warning signal and/or the error signal are suppressed over a defined period of time.

18. The method as claimed in claim 3, wherein the warning signal and/or the error signal are suppressed over a defined period of time.

19. The method as claimed in claim 4, wherein the warning signal and/or the error signal are suppressed over a defined period of time.

20. The method as claimed in claim 5, wherein the warning signal and/or the error signal are suppressed over a defined period of time.

* * * * *